United States Patent
Van Gennip et al.

(10) Patent No.: US 7,313,785 B2
(45) Date of Patent: Dec. 25, 2007

(54) METHOD AND SYSTEM FOR GENERATING EXECUTABLE CODE FOR FORMATTING AND PRINTING COMPLEX DATA STRUCTURES

(75) Inventors: Edward Van Gennip, Toronto (CA); Mark F. Wilding, Barrie (CA); Daniel A. Wood, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 10/426,384

(22) Filed: Apr. 29, 2003

(65) Prior Publication Data

US 2004/0158824 A1 Aug. 12, 2004

(30) Foreign Application Priority Data

Feb. 11, 2003 (CA) .................................... 2418670

(51) Int. Cl.
G06F 9/44 (2006.01)
G06F 9/45 (2006.01)

(52) U.S. Cl. ...................... 717/130; 717/140
(58) Field of Classification Search ............... 717/120, 717/127–130, 140
See application file for complete search history.

(56) References Cited

U.S. PATENT DOCUMENTS

| 5,230,049 | A | 7/1993 | Chang et al. |
|---|---|---|---|
| 5,535,318 | A | 7/1996 | Motoyama et al. |
| 5,659,753 | A | 8/1997 | Murphy et al. |
| 5,675,730 | A | 10/1997 | Perdue et al. |
| 6,085,196 | A | 7/2000 | Motoyanna et al. |
| 6,110,226 | A | 8/2000 | Bothner |
| 6,137,488 | A | 10/2000 | Kraft et al. |
| 6,938,260 | B1* | 8/2005 | Wason ........................ 719/316 |
| 2003/0023956 | A1* | 1/2003 | Dulberg et al. ............. 717/130 |
| 2003/0159130 | A1* | 8/2003 | Broussard et al. .......... 717/120 |
| 2004/0153997 | A1* | 8/2004 | Anderson et al. ........... 717/127 |
| 2005/0044536 | A1* | 2/2005 | Kwong et al. .............. 717/128 |

FOREIGN PATENT DOCUMENTS

EP 0173122 A2 2/1998
JP 2000144443 A 5/2000

OTHER PUBLICATIONS

"The Single UNIX Specification, Versin 2" 1997 The Open Group.*
Sun Microsystems "Debugging a Program With dbx Forte Developer 7", May 2002, Sun Microsystems, Inc. Revision A, pp. 13-28, 304-306. As of Feb. 13, 2007 electronic an copy is available at 'http://aton.cerfacs.fr/Info/doc/Compilateurs/sunone7/manuals/pdf/dbx.pdf'.*

* cited by examiner

Primary Examiner—Meng-Al T. An
Assistant Examiner—Jason Mitchell
(74) Attorney, Agent, or Firm—DeLizio Gilliam, PLLC

(57) ABSTRACT

The present invention provides a complier and linker for analyzing the structures of complex data stored in memory when a print statement specified in source code refers to those complex data structures, and then generating executable code which will print the complex data when a data processing system executes the executable code.

13 Claims, 5 Drawing Sheets

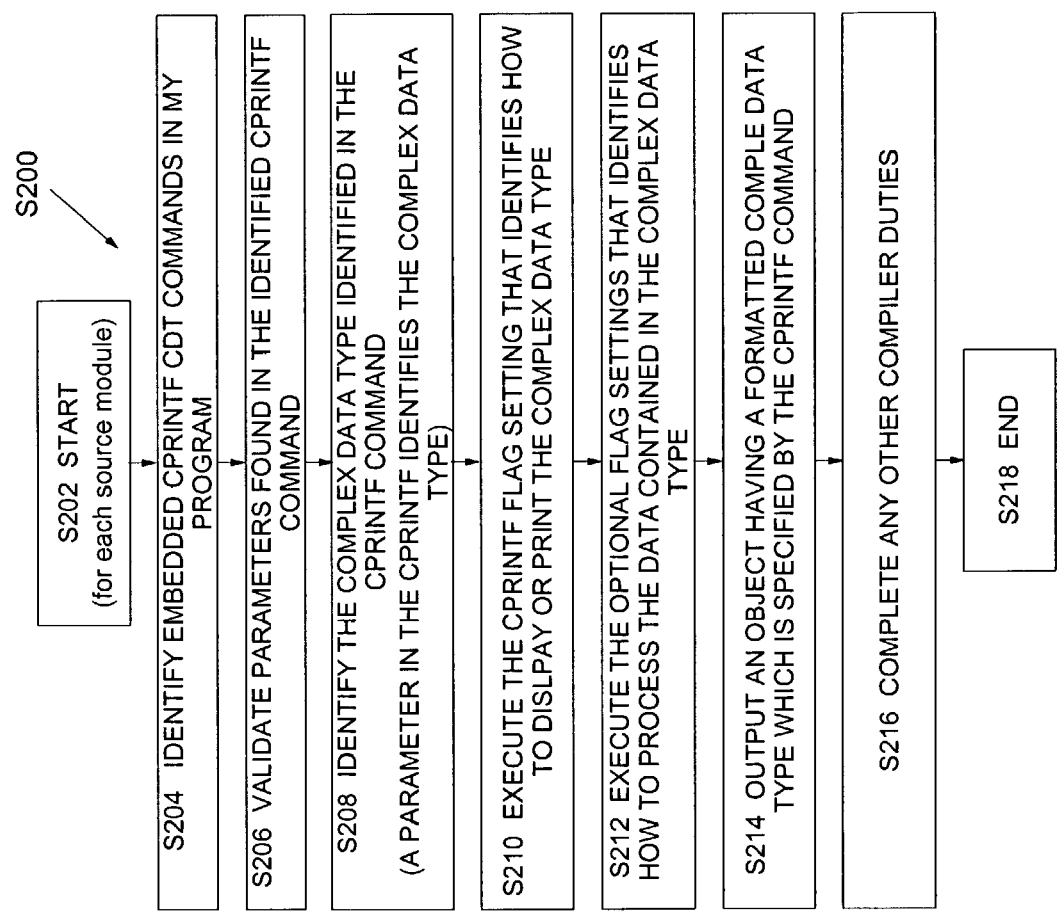
Figure 4 : OPERATION S200 OF COMPILER 20 OF FIG. 1

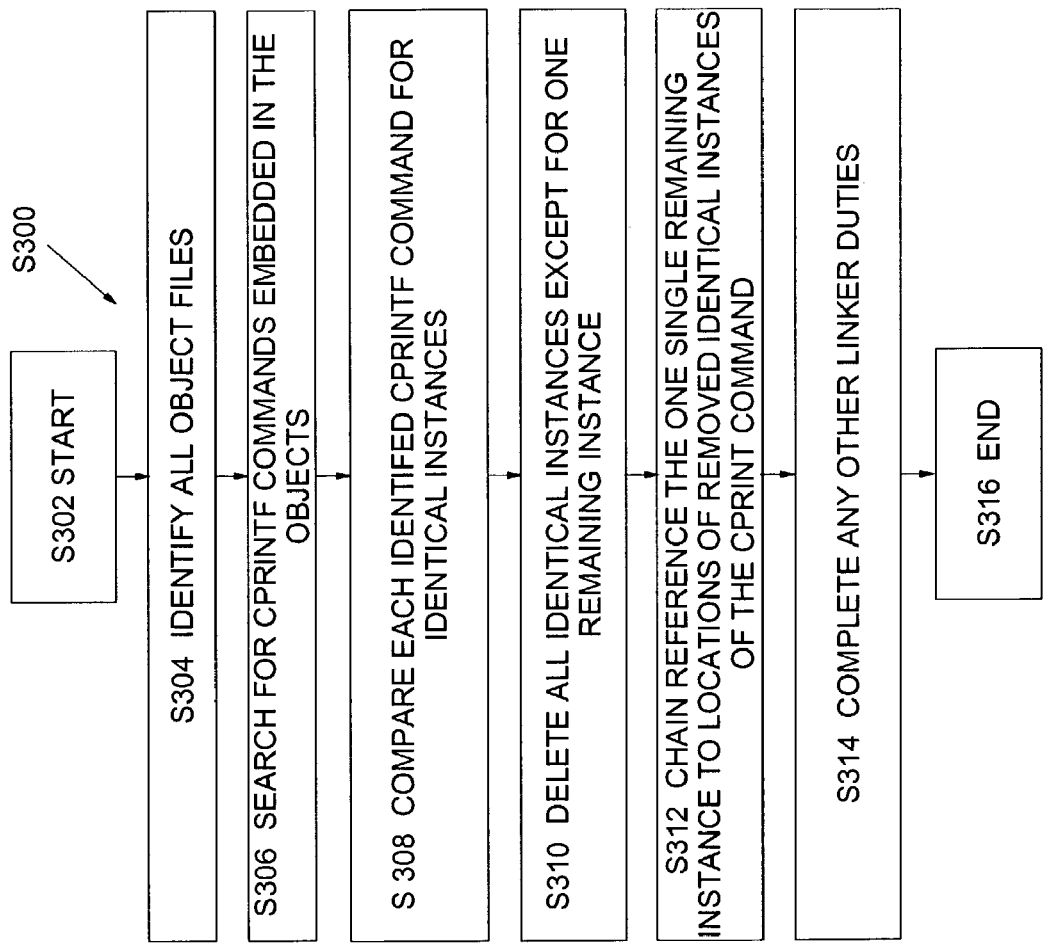

Figure 5 : OPERATION S300 OF LINKER 26 OF FIG. 1

S300

S302 START

S304 IDENTIFY ALL OBJECT FILES

S306 SEARCH FOR CPRINTF COMMANDS EMBEDDED IN THE OBJECTS

S308 COMPARE EACH IDENTIFED CPRINTF COMMAND FOR IDENTICAL INSTANCES

S310 DELETE ALL IDENTICAL INSTANCES EXCEPT FOR ONE REMAINING INSTANCE

S312 CHAIN REFERENCE THE ONE SINGLE REMAINING INSTANCE TO LOCATIONS OF REMOVED IDENTICAL INSTANCES OF THE CPRINT COMMAND

S314 COMPLETE ANY OTHER LINKER DUTIES

S316 END

METHOD AND SYSTEM FOR GENERATING EXECUTABLE CODE FOR FORMATTING AND PRINTING COMPLEX DATA STRUCTURES

BACKGROUND

It is desirable to be able to view data object structures for a variety of reasons. Most C/C++ based software products have a considerable number of complex data types including 'union', 'structure' or 'classes' that consists of one or more native types and possibly other complex data types. Many of the data types for a large software product are complex and they are not native. Native by definition are all the data types any existing compiler recognizes, commonly, but not limited to numbers, characters, dates, times, etc. Complex data type is a combination of native types and other complex types. For example a person's mailing address may be a combination of house number, street, city, country, postal/zip code. Each of these is a native type (number and list of characters). Surprisingly, there is no easy way to format these complex data types into a form that is easily readable by program developers thus enabling them to more easily and quickly diagnose problems in the source code they are developing. Currently, code developers are experiencing a very difficult task of determining how to display or otherwise output this complex information (contained in the complex data types) in a human readable form for troubleshooting source code during code development. In particular, the complex data types are not predefined and are therefore the software products have difficulties in supporting printing formats of the data.

Some known methods for resolving this problem include:
a) manually formatting complex data types,
b) using a debugger, or
c) some form of post compilation method.

A common practice for developers or service analysts is to manually format raw memory (usually in hexadecimal form) into a more human readable format. This manual process is error prone and requires intimate knowledge of the fields in the data structures (or classes), sizes, alignment, byte order, hardware architecture, etc., requiring much time and thus incurring unwanted cost.

As a result, much time is spent formatting the information related to the complex data. For example, using the mailing address above, to format manually you will need to study the complex data structure and from that determine where the house number ends and the street name begins. Then where the street name ends and the city name starts, analysis is continued this way for all fields in the complex data type. If you miscalculate a beginning or ending location your analysis will be error prone and result in wasted time and effort until the mistake is realized and the calculation corrected.

Additionally, using a debugger to format complex data types requires a software product to be built with extra debug information. This results in larger and slower programs possibly affecting the nature of the problem. A debugger may not be available on a customer's machine and customer may not want to purchase one. Debuggers often incur significant overhead in load on a system and slow down the normal execution of a program. This slowdown could drastically affect the occurrence of the problem, thus making it difficult to reproduce and solve.

Another solution is for the program developer to write custom program logic to print complex data types without relying on a compiler to generate the code for printing. The problem here is additional work placed on the program developer, and more importantly, should the complex data type ever change by the addition or removal of a field, then the program developers needs to remember to update their custom written print logic to handle the addition or removal. This is very error prone and possibly time consuming depending on the amount of change.

Post compilation methods are also not well suited for logging error messages with complex data types, and these methods require extra complexity in the development environment.

Known debuggers may provide a function for printing complex data structures. Known debuggers also display memory in a formatted form, variable by variable, structure by structure, and they allow the expanding of structures and arrays to see contents and nested structures. An example of this is the IBM Distributed Debugger product. The disadvantage provided by known debuggers is that they are supplied as a separate product, and they operate independently of the software program product that requires debugging. A debugger provides a very complicated solution. What is needed is a simple solution that does not require other programs (that is debuggers) to be operating while the software that requires debugging operates. Known debuggers require a very large learning curve. They also require the computer program being debugged to be active and executing while the debugger is active. The debugger requires debuggable code, whereas most production environments require highly optimized code for performance as well as size requirements. Known debuggers interact with running programs, and thus affecting performance which may affect the timing within the program and thus affect the problem occurrence.

Accordingly, a solution that addresses, at least in part, this and other shortcomings is desired.

SUMMARY

It is an object of the present invention to provide a system, computer program product, network downloadable code, and a method for generating code for formatting and printing complex data structures.

Advantageously, the present invention requires the compiler and the linker to set up the executable program. The executable program (the program to be fixed) runs on its own without having to have any other program (like a debugger) run along side of the executable program to be fixed.

In an embodiment of the present invention, there is provided a compiler for compiling source code into object code, the source code including a print command, the print command for abstracted printing of a complex data structure accessible by the compiler, the object code including code for directing a data processing system to print the complex data structure, the compiler including: an identifier module for recognizing the print command in the source code, a type module for identifying the complex data structure of the print command from a set of user-defined data types, a format module for formatting output settings of the complex data structure, the output settings dependent upon at least one print parameter associated with the print command, and wherein the results of the modules are adapted to define the object code with an embedded print command.

In another embodiment of the present invention, there is provided a computer program product having a computer-readable medium tangibly embodying computer readable instructions for directing a compiler operable in a data processing system to compile source code into object code, the source code including a print command, the print command for abstracted printing of a complex data structure accessible by the compiler, the object code including code for directing a data processing system to print the complex data structure, the computer program product including: computer readable code for implementing an identifier module for recognizing the print command in the source code, computer readable code for implementing a type module for identifying the complex data structure of the print command from a set of user-defined data types, computer readable code for implementing a format module for formatting output settings of the complex data structure, the output settings dependent upon at least one print parameter associated with the print command, and wherein the results of the modules are adapted to define the object code with an embedded print command.

In yet another embodiment of the present invention, there is provided an article including: a computer-readable signal-bearing medium being uploadable and downloadable on a network, and means in the medium for directing a data processing system to execute a compiler for compiling source code into object code, the source code including a print command, the print command for abstracted printing of a complex data structure accessible by the compiler, the object code including code for directing a data processing system to print the complex data structure, the means in the medium including: means in the medium for implementing an identifier module for recognizing the print command in the source code, means in the medium for implementing a type module for identifying the complex data structure of the print command from a set of user-defined data types, means in the medium for implementing a format module for formatting output settings of the complex data structure, the output settings dependent upon at least one print parameter associated with the print command, and wherein the results of the modules are adapted to define the object code with an embedded print command.

In yet another embodiment of the present invention, there is provided a linker for linking components of an object code to produce an executable code, some components of the object code adapted to have an individual copy of a printing object for printing a complex data structure, the linker including: an identifier module for recognizing at least one of the object components having an embedded print command corresponding to the individual printing object, the embedded print command for abstracted printing of the complex data structure, a compare module for comparing two or more identified embedded print commands from the object components, the comparison for determining whether two or more of the identified embedded print commands are identical copies of the individual printing object, and wherein the results of the modules are adapted to define the executable code with at least one executable print command corresponding to the embedded print command.

In yet another embodiment of the present invention, there is provided a computer program product having a computer-readable medium tangibly embodying computer readable code for directing a data processing system to implement a linker for linking components of an object code to produce an executable code, some components of the object code adapted to have an individual copy of a printing object for printing a complex data structure, the computer program product including: computer readable code for implementing an identifier module for recognizing at least one of the object components having an embedded print command corresponding to the individual printing object, the embedded print command for abstracted printing of the complex data structure, computer readable code for implementing a compare module for comparing two or more identified embedded print commands from the object components, the comparison for determining whether two or more of the identified embedded print commands are identical copies of the individual printing object, and wherein the results of the modules are adapted to define the executable code with at least one executable print command corresponding to the embedded print command.

In yet another embodiment of the present invention, there is provided an article having a computer-readable signal-bearing medium being uploadable and downloadable on a network, and means in the medium for directing a data processing system to implement a linker for linking components of an object code to produce an executable code, some components of the object code adapted to have an individual copy of a printing object for printing a complex data structure, the means in the medium including: means in the medium for implementing an identifier module for recognizing at least one of the object components having an embedded print command corresponding to the individual printing object, the embedded print command for abstracted printing of the complex data structure, means in the medium for implementing a compare module for comparing two or more identified embedded print commands from the object components, the comparison for determining whether two or more of the identified embedded print commands are identical copies of the individual printing object, and wherein the results of the modules are adapted to define the executable code with at least one executable print command corresponding to the embedded print command.

In yet another embodiment of the present invention, there is provided a computer program product having a medium tangibly embodying computer readable code for implementing a print function for directing a compiler to generate an embedded print command in an object code for directing a data processing system to print a complex data structure identified by the print function, the print function for use in source code, the computer program product including: computer readable code for implementing a buffer parameter for identifying the buffer to receive the complex data structure selected from a set of user-defined data types, computer readable code for implementing a size parameter for limiting the size of the buffer, computer readable code for implementing a type parameter that is internal to the compiler, the type parameter for accepting complex data types corresponding to the complex data structure, computer readable code for implementing an output parameter for representing the output settings of the complex data structure, and wherein an executable version of the embedded print command is used by the data processing system for abstracted printing of the complex data structure.

In yet another embodiment of the present invention, there is provided an article including: a computer-readable signal-bearing medium being uploadable and downloadable over a network, and means in the medium for directing a data processing system to implement a print function for directing a compiler to generate an embedded print command in an object code for directing a data processing system to print a complex data structure identified by the print function, the print function for use in source code, the means in the medium including: means in the medium for implementing a buffer parameter for identifying the buffer to receive the complex data structure selected from a set of user-defined data types, means in the medium for implementing a size parameter for limiting the size of the buffer, means in the medium for implementing a type parameter that is internal to the compiler, the type parameter for accepting complex data types corresponding to the complex data structure, means in the medium for implementing an output parameter for representing the output settings of the complex data structure, and wherein an executable version of the embedded print command is used by the data processing system for abstracted printing of the complex data structure.

These and other features of the preferred embodiments of the invention will become more apparent in the following detailed description in which reference is made to the appended drawings by way of example only, in which:

FIG. 4 is a flowchart of the operation of the compiler of FIG. 2; and

FIG. 5 is a flowchart of the operation of the linker of FIG. 3.

Similar references are used in different figures to denote similar components.

DETAILED DESCRIPTION

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system or computer programming language and would not be a limitation of the present invention.

A compiler is adapted to generate (on the fly) a function to 'print' a particular structure or data type, while parsing the source code. The embedded print functions can be used by a developer to view or otherwise output complex data object structures. The printing/outputting of the structure/data type can include such as but not limited to displaying the information on a computer screen, displaying the information on a hard copy (paper, etc *, and/or storing the information in a file for later retrieval and viewing. It is recognized that data structures/types can be such as but not limited to data objects, which are groupings of data items called attributes. Further, the set of attributes and corresponding values make up an instance of the data object, such as but not limited to a database table where columns are attributes and rows are instances.

The following is an example of a print function 10 (see FIG. 1) (for example in the C or C++ language) or command that may be inserted or included in the source code (that is, My Program) for generating display information of the data structure/type:

size_t cprintf (void*buf, size_t bsize, _ctype_val, int opts, int slen)

Figure 1:
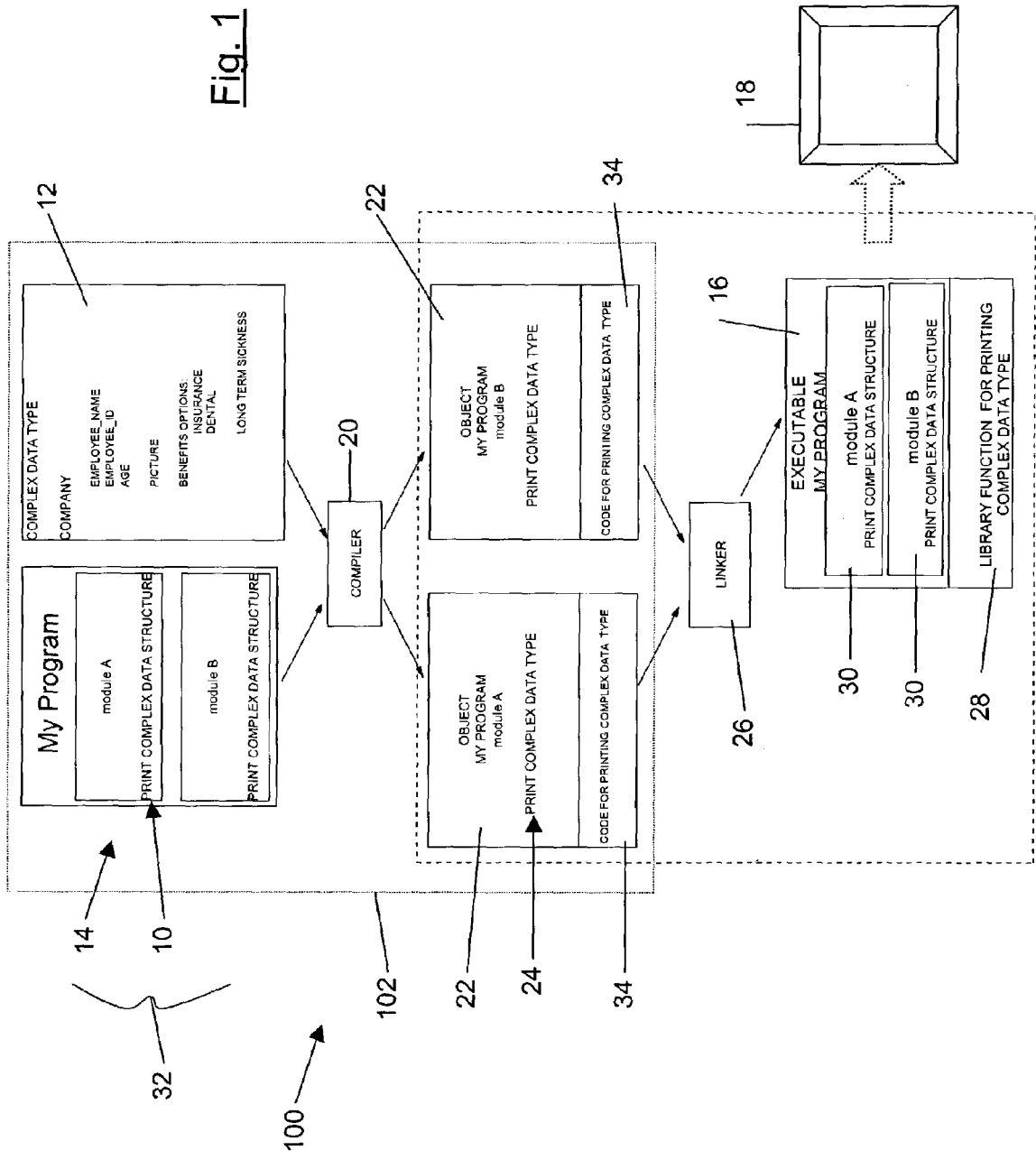
FIG. 1 is a schematic diagram of a data processing system.

Referring to FIG. 1, the print function or the command 10 directs a data processing system 100 to print (or otherwise view) a complex data structure 12, once a source code 14 has been compiled and linked to generate executable code 16 which will direct the data processing system 100 to print the complex data structure 12 on an output device 18, such as but not limited to a computer display, a printer, and/or a stored file for subsequent review. The complex data structure 12 may include, but are not limited to strings of text, numbers, dates, times, binary information such as pictures, sound, video, etc. For example, this print function 10 will be read by a compiler 20, which subsequently produces an object code 22 including a print command 24 to print the complex data structure 12 identified in the print command 10.

The following describes the variables, parameters, and/or options included in the example print function, command or statement 10, namely cprintf.

cprintf

This is the function 10 that prints to the buffer 'buf' that has a maximum size of 'bsize'. The function 10 prints a variable 'val' of type '_ctype_'. The 'cprintf' function and '_ctype_' may both be implemented internally in the compiler 20, and may be reserved words. 'ctype' means complex data type 12. In a default case, the 'void*buf' can be a 'char*buf'.

The cprintf function 10 may format the complex data structure 12, or more basic type such as string, into a human readable form for output to the output device 18, such as but not limited to a similar output format typically produced by a debugger. For example an address could be stored in a binary format, such as '7B414E89535452454554' which converts to '123 ANYSTREET'. '7B' is the hexadecimal value of 123, and the remainder being the hexadecimal value of 'ANYSTREET'. It is assumed this latter text format is easier to check for validity.

Parameter Ctype

This is a compiler front end internal type that accepts any data type. This includes native types such as 'int', 'float' or complex data types such as structures, classes or unions, as well as arbitrary data such as but not limited to pictures and text strings.

Parameter Opts

The following options may be included in opts field as flags to define the operation of the print function 10 cprintf. The options may include:

Option A. A Default Return Buffer

The default returned buffer is a delimited list of strings containing the information where each field within a single data type is also delimited. An example output buffer is shown below. Actual buffer content delimiters can vary. This is just one sample. This example uses a tab delimiter (\t) character, with NULL (\0) as end of returned buffer delimiter.

Field1_name \t field1_type \t field1_length \t field1_value \t field1_offset \t field2_name \t field2_type \t field2_length \t field2_value \t field2_offset \0

An additional option can be defined for changing the return information to be a pointer to an area of memory the print function 10 has allocated which contains a linked list structure of data type 12 information. If this option is set then bsize is expected to be the maximum number of levels of recursion allowed, and buf is a location to store the returned structure pointer. In this case the calling function is responsible for freeing each structure in the linked list.

Option B.

An option for including the offsets of fields or structure members of the complex data structure 12 is placed in the returned buffer. The returned buffer is defined above by example.

Option C.

An option includes placing the size of each field or structure member of the complex data structure 12 in the returned buffer.

Option D.

An option to include any pads that might have been included for alignment purposes in the returned buffer. A pad is space allocated in the buffer to force the fields of the complex data type to align as the compiler 20 wants them to. Including pads can make it easier for a program developer to determine the start and end of each field for eventual viewing on the output device 18.

Option E.

This option identifies the method of printing nested complex data types 12 either via a loop of program code or recursively calling cprintf for each non-native structure within the complex data structure. (i.e. not for a char or an integer, native types). Nesting means that the complex data type 12 is included inside another complex data type 12. For example an employee complex data type 12 would include the home address complex data type 12, as well as the work address complex data type 12, the salary/benefits complex data type 12 and others.

Option F.

An option to indicate that nested complex data types 12 can be printed with the current-complex data type 12 being printed or for indicating that the nested complex data type 12 are not to be printed.

Option G.

This option includes placing the full scope of each complex data type 12 in the return buffer. The scope can be defined by the source filename, function or method name and possibly a local scope definition, such as a static section.

Option H.

This option causes the return buffer to be written to the stored file instead of being returned in memory, to the caller of the print function 10, in an in-memory buffer. This can reduce the truncation of huge or nested complex data types 12. In this case the void*buf, shown in the C/C++ example above would really be a FILE*buf (that is, the pointer to the file). The caller is responsible for opening/closing the file. Output is written to the current location within the stream or may be appended to the end of the file.

Option I.

This option indicates that the print function 10 should return all native int types (that is, integer types) in hexadecimal format, an example of which is the address complex data type shown above in the "123 ANYSTREET" example.

Option /Fs[+/−]

Unlike the previous options to the print function 24, this option is presented to the compiler 20 itself. The purpose of the option is to enable or disable the processing of the print function 24. The default option is /Fs−. This option is turned off meaning that the print function 24 does not generate any code in the object file 22. When the /Fs+ option is specified the object file 22 is created with the print program logic enabled as summarized above. If the cprintf option is turned off, then a default string will replace the formatted complex data type 12 such as "Formatted data type is not available as compiler option /Fs+ was not specified".

Further, a call back function may be included in the front end compiler 20 for supporting an application writer (not shown) The application writer may use this call back function for registering the writer's formatter according to specific specifications and thus this ensures the above information/requirements are met. For example, the formatter may be adapted to handle a certain complex or native data type 12, say password fields, and replaces a password with asterisks before returning the formatted information. This call back function may return flags which could control whether the complex data type 12 is to be printed at all.

Parameter Slen

The slen argument sets a limit on the length of each native string data type that can be put into the returned buffer. For example, some strings may be 1000 or 10000 characters long. We may not want or need all that information. The first 100 characters may be enough. This option allows for that restriction.

Another embodiment of the invention provides the compiler 20 having another internal function, which is called max size:

size_t cgetmaxsize(_ctype_val, int opts, int slen)

This internal function determines the maximum size of the returned buffer for formatting the complex data type 12. The maxsize function can be used to determine the amount of space needed to be able to contain the fully formatted complex data type 12. Since the complex data type 12 is known by the compiler 20 at compile time, the compiler 20 front end may turn this into a compile time constant.

Using the C/C++ example above, the compiler 20 creates a version of print function 10, cprintf as function 24, for the type val that would include the scope of val (i.e. file name, or other). It should be noted that the scope was defined above under option G.

Referring again to FIG. 1, a linker 26 provides a linkage phase for creating an executable or shared library 28, which would collapse any duplicate executable print functions 30 into one instance of the print function 24, thus eliminating any duplicate print functions. It should be noted that complex data types 12 that have the same name but different type and scope would not collapse into the single print function 30 but would remain unique due to the different scope and type. The resulting executable or shared library 28 contains one copy of the executable print function 30 for every type that used an instance of cprintf function 24.

Figure 2:
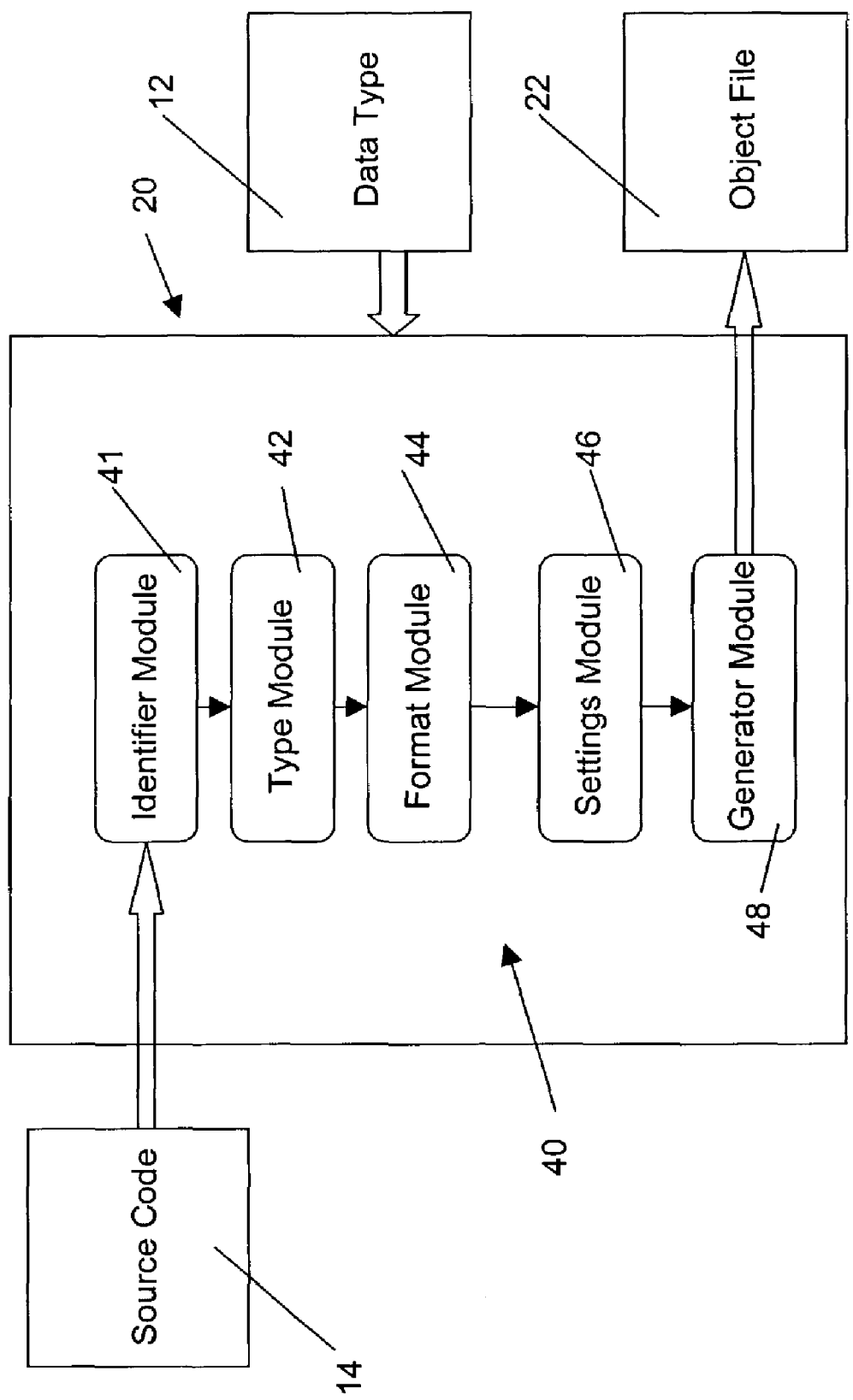
FIG. 2 is a diagram of a compiler of the system of FIG. 1.

Referring to FIG. 2, the compiler 20 contains a number of modules 40 for creating the object print command 24. An identifier module 41 recognises the cprintf functions 10 in the source code 14 during compilation. A type module 42 identifies the complex data type 12 contained in the recognized print commands 10 from a user-defined number of data types known to the compiler 20. A format module 44 operates on the settings of the print command 10 that determine how to display or otherwise format the complex data type 12, as initially specified by the developer of the code 14. The compiler 20 can also have a settings module 46 for compiling any optional flag settings. The compiler also has an object file generator module 48 for assembling an object file containing the embedded compiled print command 24 with associated code 34.

Figure 3:
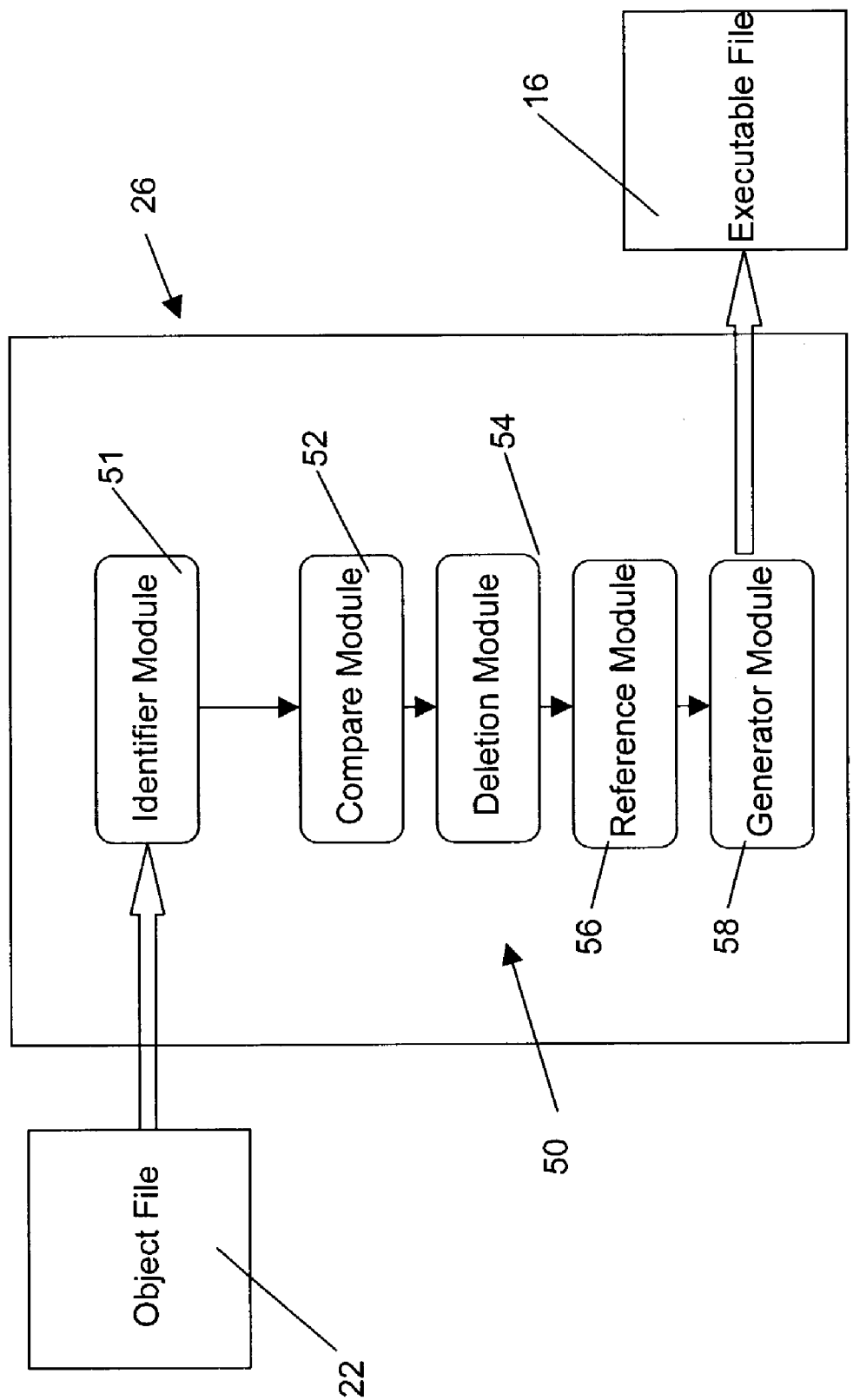
FIG. 3 is a diagram of a linker of the system of FIG. 1.

Referring to FIG. 3, the linker 26 contains a number of modules 50 for creating the executable commands 30. An identifier module 51 recognises all object files 22 and searches for the embedded object print commands 24. A compare module 52 compares each identified print commands 24 for identical instances of the commands 24. The linker 26 also has a deletion module 54 for code optimisation purposes, which deletes all identical copies of each print command 24 instance save one, while a reference module 56 references the remaining instance of the command 24 to the locations of the deleted commands 24, thus providing a library function 28 containing the remaining instance of the now executable commands 30. The linker 26 also has a generator module 58 for generating the executable file 16 containing the executable print commands 30 for each executable modules A, B. It should be noted that these modules A, B may not be executable, rather they may be combined into one executable module, or may be such as but not limited to separate modules A, B depending upon the linker 26 options.

Referring now to FIG. 1, in view of the above, while the compiler 20 is processing the source file 14 it detects the print functions 10 and thus generates in the object file 22 the program logic 34 to print the complex data type 12 specified in the print statement 24. The linker 26 uses the object file 22 to link the reference/executable commands 30 from the print function 24 to the program logic 34 just created and stored in the library 28.

Referring again to FIG. 1, the linker 26 can also be used to identify all embedded print commands 24 in the object files 22. For example, each of the commands 24 may be unique, and therefore each of the print commands 24 would be referenced by the reference module 56 to create a corresponding number of the executable print commands 30. Therefore, the deletion module 54 would not be used in this case where each of the print commands 24 are unique The print function 24 is created in the compiler 20, as the information to do the job is already known by the compiler 20. For example, the compiler 20 knows all the data types, tracks and formats all the structures, and knows the byte alignment. All the compiler 20 does is to take this already known information and package it in the format as described above, to produce the object command 24 as a component of the relatively optimized compilation of the source code 14. It should be noted that the compiler 20 is a single separate grouping of modules for running against the optimized code. Accordingly, the compiler 20 is a computer front-end enhancement that helps to generate embedded print functions 24 in the object files 22 for the selected data structures/ types.

Referring again to FIG. 1, an example of the data processing system 100 has a memory 102 for storing the source code 14, the complier 20, and the linker 26. The source code 14 consists of two pieces or modules 32: source module A and source module B. Also stored in the memory 102 is the complex data type 12 named COMPANY, for example. The source code 14 (the computer program that requires debugging or analysis) and the complex data type 12 are input to the compiler 20 (that is the complier 20 reads these items). The compiler 20 then generates the object module A and the object module B. Each of these object modules 22 contain program code 34 to handle the printing of data type 12. This is because each source module 32 can print the COMPANY complex data type 12.

FIG. 4 shows operations S200 the compiler 20 of FIG. 1. Operations S200 are for embedding the print command 24 (for printing the complex data type 12) into the object code 22 (see FIG. 1). Operation S202 includes starting the compiler 20 (these operations S202 to S218 are performed for each source module 32 that was identified or read by the complier 20). Operation S204 includes identifying embedded cprintf cdt commands 10 in the source modules 32. Operation S206 includes validating parameters found in the identified cprintf command 10, including for example the options as described above. Operation S208 includes identifying the complex data type 12 identified in the cprintf command 10 (a parameter in the cprintf identifies the complex data type 12 selected from a set of user-defined data types 12 known to the compiler 20). Operation S210 includes executing the cprintf flag settings that identify how to output or otherwise print the selected complex data type 12. Operation S212 includes executing any optional flag settings that identify how to process the data contained in the complex data type 12. Operation S214 includes outputting or generating the object file 22 having the formatted complex data type 12 which is specified by the object cprintf command 24. Finally, operation S216 includes completing any other compiler 20 duties or operations to complete the object file 22, with operation S218 including ending operations of the compiler 20.

Once the compiler 20 has completed the operation for producing the object file 22 that corresponds to the source modules 32, then the linker 26 operates to generate the executable file 16 (see FIG. 1). Referring now to FIG. 5, there is depicted operation S300 of the linker 26 of FIG. 1. In summary, the linker 26 takes in all the object modules or components 22 and looks for duplicate sections of code for the print command 24 of each complex data type 12. In this example, the linker 26 sees that both object module A and object module B print the same COMPANY complex data type 12. As they both print the same one, they can use the same executable print code 30 to print that complex data type 12, and thus one of the object modules code 34 to handle the print command 30 can be removed and replaced with a much smaller set of code that simply tells the object module to use the reaming print code 28 stored for example in the library.

Operation S302 includes starting the operation of the linker 26. Operation S304 includes identifying all object files 22. Operation S306 includes searching for cprintf commands 24 embedded in the object files 22. Operation S308 includes comparing each identified cprintf command 24 for identical instances. Operation S310 includes deleting all identical instances except for one remaining instance in the library 28. Operation S312 includes chain referencing the one single remaining instance to locations of removed identical instances of the executable cprint commands 30 now in the executable file 16 (see FIG. 1). Operation S314 includes completing any other linker 26 duties to complete the executable files 16. Operation S316 includes ending operations of the linker 26.

Once the linker 26 has generated the executable code 16, the executable code 16 may be executed by the data processing system 100 of FIG. 1 and the complex data type 12 may be printed by the output device 18, and the source code 14 may then be debugged according to the skills of the software developer.

Referring back to FIG. 1, an alternative embodiment provides a computer program product (not depicted) which includes a computer-readable medium tangibly embodying computer executable instructions that direct the data processing system 100 to implement any complier 20 as previously described above. It will be appreciated that the computer program product may be a floppy disk, hard disk or other medium for long term storage of the computer executable instructions.

Also, another alternative embodiment provides an article which has a computer-readable, signal-bearing medium, and also has means or mechanism in the medium for directing the data processing system 100 to implement any complier 20 as previously described above. It will be appreciated that a supplier of the complier 20 may upload the article (not depicted) to a network (such as the internet) and users may download the article via the network to their respective data processing systems.

It will be appreciated that another alternative embodiment may provides a computer program product having a computer-readable medium that tangibly embodies computer executable instructions for directing the data processing system 100 to implement any linker 26 as previously described above. It will be appreciated that the computer program product may be a floppy disk, hard disk or other medium for long term storage of the computer executable instructions.

Also, another embodiment provides an article that has a computer-readable signal-bearing medium, and that also has means or mechanisms in the medium for directing the data processing system 100 to implement any linker 26 as previously described above. It will be appreciated that a supplier of the linker 26 may upload the article to a network (such as the internet) and users may download the article via the network to their respective data processing systems.

It will be appreciated that variations of some elements are possible to adapt the invention for specific conditions or functions. The concepts of the present invention can be further extended to a variety of other applications that are clearly within the scope of this invention. Having thus described the present invention with respect to the preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

Furthermore, the following is an example of a C language source code listing that includes the printing statement 10 as contained in the source code 14.

```
// define a complex data type consisting of two native types
and another complex data type
// the native types being the int (integer) and char (character
string).
struct myStruct {
    struct myOtherStruct embeddedStruct;
    int nativeIntegerType;
    char *pNullTerminatedString;
};
// example function which determines the size of a buffer needed
to print the above
// complex data type 'myStruct', and then prints it to an write
to an in memory buffer
int foo( ) {
    rc = someFunction( &myStruct );
    if ( rc != 0 ) {
        // determine size of buffer needed
        char structBuff[cgetmaxsize( struct myStruct,
CPRINTF_RECURSIVE, 10)];
        // print the complex data type
        cprintf( structBuff, cgetmaxsize( struct myStruct,
CPRINTF_RECURSIVE, 10), myStruct, CPRTNTF_RECURSIV,
10);
}
// same example as above except write to a File stream instead
of in memory buffer.
int foo( ) {
    rc = someFunction( &myStruct );
    if ( rc != 0 ) {
        fprintf( fptr, "someFunction returned an error %d with
structure:\n\n", rc );
        cprintf( fptr, myStruct, 0, CPRINTF_RECURSIV, 10);
    }
}
```

The embodiments of the invention in which an exclusive property or privilege is claimed are defined as follows:

1. A compiler executing on a processor, the compiler for compiling source code into object code, the source code including a print command, the print command for abstracted printing of a complex data structure accessible by the compiler, the object code including code for directing a data processing system to print the complex data structure, the compiler comprising:

an identifier module for recognizing the print command in the source code;

a type module for identifying the complex data structure of the print command from a set of user-defined data types;

a format module for determining output settings for the complex data structure, the determination dependent upon at least one print parameter associated with the print command;

a settings module for including at least one optional flag setting of the print command in the output settings; and a generator module for dynamically generating, based on the determination of the output setting, program logic for the print command, the generator module also for creating, based on the program logic, object code for the print command.

2. A computer program product having a computer-readable medium tangibly embodying computer readable instructions for directing a compiler operable in a data processing system to compile source code into object code, the source code including a print command, the print command for abstracted printing of a complex data structure accessible by the compiler, the object code including code for directing a data processing system to print the complex data structure, the computer program product comprising:

computer readable code for implementing an identifier module for recognizing the print command in the source code:

computer readable code for implementing a type module for identifying the complex data structure of the print command from a set of user-defined data types;

computer readable code for implementing a format module for determining output settings for the complex data structure, the determination dependent upon at least one print parameter associated with the print command;

computer readable code for implementing a settings module for including at least one optional flag setting, of the print command in the output setting; and computer readable code for implementing a generator module for dynamically generating, based on the determination of the output settings, program logic for the print command, the generator module also for creating, based on the program logic, object code for the print command.

3. The computer program product of claim 2 wherein the data processing system uses the object code for the print command to print the complex data structure to an output device.

4. The computer program product of claim 3, wherein the optional flag setting provides for a default return buffer.

5. The computer program product of claim 4, wherein the optional flag provides for a size of each field in the complex data structure.

6. The computer program product of claim 4, wherein the optional flag setting further includes a pad for aligning the fields of the complex data structure.

7. The computer program product of claim 3, wherein the complex data structure includes data types selected from the group comprising structures, classes, and unions.

8. A computer program product having a medium tangibly embodying computer readable code for directing a compiler to generate object code for directing, a data processing system to print a complex data structure identified by a print command in source code, the computer program product comprising:

computer readable code for implementing a buffer parameter for identifying a buffer to receive the complex data structure selected from a set of user-defined data types;

computer readable code for implementing a size parameter for limiting the size of the buffer;

computer readable code for implementing a type parameter that is internal to the compiler, the type parameter for accepting complex data types corresponding to the complex data structure;

computer readable code for implementing an output parameter for representing the output settings of the complex data stucture;

computer readable code for implementing at least one optional flag setting for affecting the output parameter;

computer readable code for generating, based on the output parameter, program logic for a print function for the complex data structure;

computer readable code for generating object code for the print command that uses the program logic, wherein the object code for the print command is used by the data processing system for abstracted printing of the complex data structure.

9. The computer program product of claim 8, wherein the optional flag setting provides for a default return buffer.

10. The computer program product of claim 9, wherein the return buffer is adapted to contain a pointer to an area of memory of the data processing system.

11. The computer program product of claim 9, wherein the optional flag setting provides for a size of each field in the complex data structure.

12. The computer program product of claim 8, wherein the optional flag setting provides for the return buffer to be written to a stored file.

13. The computer program product of claim 8 further comprising computer readable code for implementing a size function for determining the maximum size of a return buffer.

* * * * *